United States Patent
Murayama

[11] Patent Number: 5,115,479
[45] Date of Patent: May 19, 1992

[54] IMAGE DATA PROCESSING METHOD FOR COMPRESSING AN IMAGE BY APPROXIMATING CURVES USING A POLYNOMIAL

[75] Inventor: Noboru Murayama, Machida, Japan
[73] Assignee: Ricoh Company, Ltd., Japan
[21] Appl. No.: 768,465
[22] Filed: Sep. 30, 1991

Related U.S. Application Data

[63] Continuation of Ser. No. 391,788, Aug. 9, 1989, abandoned.

[30] Foreign Application Priority Data

Aug. 10, 1988 [JP] Japan ............................. 63-198015

[51] Int. Cl.$^5$ .............................................. G06K 9/46
[52] U.S. Cl. ...................................... 382/56; 340/735; 395/142; 395/150
[58] Field of Search ................ 382/56; 340/723, 735; 395/100, 110, 114, 141-143, 150

[56] References Cited

U.S. PATENT DOCUMENTS

| | | | |
|---|---|---|---|
| 4,254,468 | 3/1981 | Craig | 364/523 |
| 4,542,412 | 9/1985 | Fuse et al. | 358/260 |
| 4,566,128 | 1/1986 | Araki | 382/56 |
| 4,620,287 | 10/1986 | Yam | 364/518 |
| 4,674,058 | 6/1987 | Lindbloom et al. | 364/518 |
| 4,907,282 | 3/1990 | Daly et al. | 382/9 |
| 4,943,935 | 7/1990 | Sato | 364/518 |

Primary Examiner—Leo H. Boudreau
Assistant Examiner—Andrew W. Johns
Attorney, Agent, or Firm—Mason, Fenwick & Lawrence

[57] ABSTRACT

A method of processing an image data of a two-dimensional curve comprises steps of detecting an initial point of the curve as a first vector data, detecting a terminal point of the curve as a second vector data, detecting a tangential in contact with the curve, detecting an initial point of the tangential defined as an intersection of the first mentioned tangential and another tangential of the curve passing through the initial point of the curve as a third vector data, detecting a terminal point of the first mentioned tangential and still another tangential of the curve passing through the terminal point of the curve as a fourth vector data, and reproducing the curve by a polynomial defined by $$M(X,Y) = A(1-t)^3 + (cP - (c - 3(A)1-t)^2 t + (dQ - (d-3)E(1-t)(1-t)t^2 + Et^3$$

where A stands for the first vector data, E stands for the second vector data, P stands for the third vector data, Q stands for the fourth vector data, c and d are predetermined coefficients, and t is a parameter changing its value between zero and one.

10 Claims, 5 Drawing Sheets

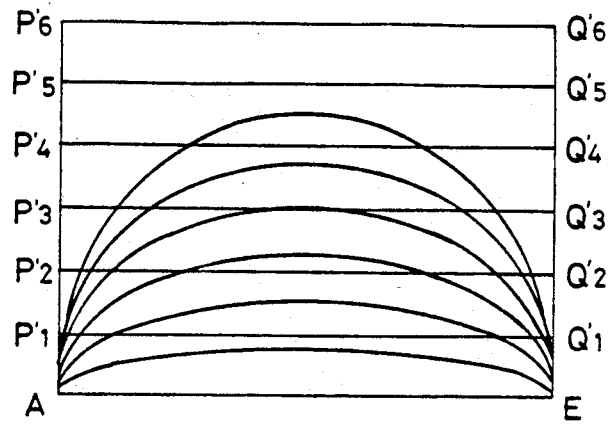
(PRIOR ART)
FIG. I(A)
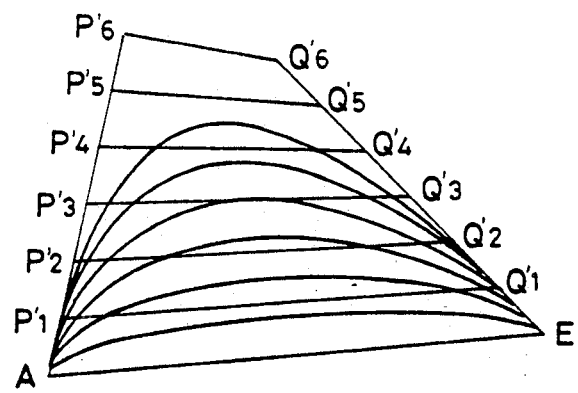
(PRIOR ART)
FIG. I(B)

IMAGE DATA PROCESSING METHOD FOR COMPRESSING AN IMAGE BY APPROXIMATING CURVES USING A POLYNOMIAL

This application is a continuation of U.S. patent application Ser. No. 07/391,788, filed Aug. 9, 1989, now abandoned.

BACKGROUND OF THE INVENTION

The present invention generally relates to processing of image data and more particularly to an image data processing method for compressing two-dimensional curve image data and for expanding the information thus compressed.

In a field of image processing, a two-dimensional curve image is usually decomposed into a number of segments, and vectors are assigned in correspondence to each of the segments. Thus, the curve is represented by a number of vectors each corresponding to the segment. In such a method, when the curve has a large curvature, a large number of vectors are needed. Associated therewith, information to be processed is increased, which causes a difficulty in transmission or storage in memory. Further, such a method has a problem of synthesizing a smooth curve as the synthesis of the curve is made on the basis of connection of a number of these segments.

In order to avoid these problems, there has been proposed to use the Bezier's equation for approximation of the curve. According to this method, the curve is approximated by the following equation:

$$B(X,Y) = A(1-t)^3 + 3P'(1-t)^2 t + 3Q'(1-t)t^2 + Et^3 \quad (1)$$

where $B(X,Y)$ represents a coordinate of the two-dimensional curve, A and E respectively stand for an initial point and a terminal point of the curve, P' and Q' respectively stand for an initial point and a terminal point of a line which characterizes the shape of the curve and also tangential directions at points A and E, and t stands for a parameter specifying position of a point on the curve between the point A and the point E. The parameter t assumes a value zero (0) at the point A and a value one (1) at the point E. According to Eq.(1), the curve is characterized by only four points A, E, P' and Q'.

FIGS. 1(A) and (B) show typical examples of such curves $B_1-B_6$, or $B_1'-B_6'$ wherein the shape of the curve is determined by the coordinate of the initial point A and the terminal point E as well as initial points $P_1'-P_6'$ and terminal points $Q_1'-Q_6'$, corresponding to the points P' and Q'.

As can be seen from these drawings, segments P1'Q1', P2'Q2', P3'Q3' ... respectively connecting the points $P_1'$ and $Q_1'$, $P_2'$ and $Q_2'$, $P_3'$ and $Q_3'$ ... do not make contact with respective curves and because of this, there arises a problem in that the curve generated from given control points does not closely reproduce the original image formed in a bit map. In relation with this, automatic contour coding or data compression of the image becomes difficult as the curves which can closely represent the image on the bit map has to be specified by the control points which are not on the edge of the image. Further, when the curve is located close to a marginal region of the image to be processed, there appears a case in which the points P' and Q' are located outside of image field secured for storing a bit map. In such a case, one has to provide additional memory field in correspondence to coordinates outside of the image field for accommodating these coordinate data. Such a procedure invites unwanted increase of memory space or amount of information to be processed.

SUMMARY OF THE INVENTION

Accordingly, it is a general object of the present invention to provide a novel and useful image processing method wherein the aforementioned problems are eliminated.

Another and more specific object of the present invention is to provide an image processing method wherein a two-dimensional curve is compressed effectively without losing smoothness of the curve when the curve is reproduced.

Another object of the present invention is to reproduce an image which closely represents an original image from a compressed image data.

Another object of the present invention is to provide a method of image data compression wherein determination of control points for describing a given image is performed easily and automatically on a basis of original image represented in a form of bit map.

Another object of the present invention is to provide an image processing method for compressing an information of a two-dimensional curve by four independent coordinate parameters, first one specifying an initial point of the curve, second one specifying a terminal point of the curve, third one located on a tangential passing through the initial point of the curve, and fourth one located on another tangential passing through the terminal point of the curve, wherein a line specified by the last two coordinate parameters maintains a tangential contact with the curve, and further for reproducing the image thus compressed according to an equation:

$$M(X,Y) = A(1-t)^3 + (cP - (c-3)A)(1-t)^2 t + (dQ - (d-3)E)(1-t)t^2 + E$$

where A stands for the first coordinate parameter, E stands for the second coordinate parameter, P stands for the third coordinate parameter, Q stand for the fourth coordinate parameter, c and d are predetermined coefficients, and t is a parameter between zero and one representing position of a point on the curve. According to the present invention, processing of the two-dimensional curve becomes easy as the last mentioned line connecting the third and fourth coordinate parameters maintains the tangential contact with the curve and the coordinate parameters defining the line are determined as an intersection of said line with a tangential of the curve passing through the initial point of the curve or with another tangential passing through the terminal point of the curve. The detection of these tangentials including said line is easily performed automatically by edge detection. As the image reproduced by these four coordinate parameters according to the aforementioned equation makes a tangential contact with the line connecting the third and fourth coordinate parameters, the reproduced image closely represents the original image formed on a bit map. Further, the lines characterizing the shape of the curve does not move outside of image field secured for the image and the memory space hitherto necessary when the Bezier's equation is used for storing coordinates of the lines which located outside of the image field is saved.

Other objects and further features of the present invention will become apparent from the following detailed description for preferred embodiments when read in conjunction with attached drawings.

BRIEF DESCRIPTION OF THE DRAWINGS

FIGS. 1(A) and (B) are diagrams showing a prior art data compression procedure using the Bezier's equation for a number of curves;

DETAILED DESCRIPTION

First, the principle of the present invention will be described with reference to FIG. 2(A)-(C). According to the present invention, a two-dimensional curve $M(X, Y)$ is approximated by an equation:

$$M(X, Y) = A(1-t)^3 + (cP-(c-3)A)(1-t)^2 t + (dQ-(d-3)E)(1-t)t^2 + Et^3 \quad (2)$$

where A and E stand for the initial and terminal points of the two-dimensional curve, P and Q give the tangential direction at A and E or line PQ making a tangential contact with the two-dimensional curve, and t stands for a parameter which changes its value between zero and one. Similarly to Eq.(1), the parameter t changes between zero and one. Further, c and d in Eq.(2) are predetermined coefficients. Thus, Eq.(2) has a feature in that the line PQ maintains a tangential contact with the curve $M(X, Y)$. The initial point A and the terminal point E are immediately found out by edge detection. The points P and Q, too, is easily determined by detecting a peak point of the curve and by finding out a tangential passing through the peak point. Eq.(2) reproduces the two-dimensional curve with excellent precision particularly when the coefficients c and d are set as $c=d=4$. The curve represented by such an equation has a preferable feature in that the line PQ extends parallel to a line AE connecting the points A and W.

Figure 2A:
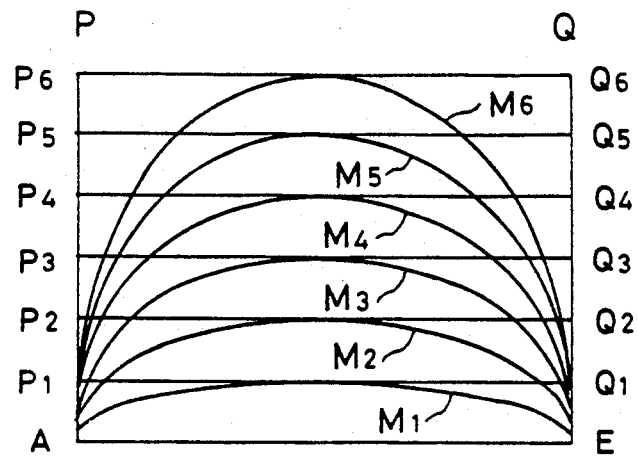
FIGS. 2(A)-(C) are diagrams showing a principle of data compression according to the present invention for various two-dimensional curves.
Figure 2B:
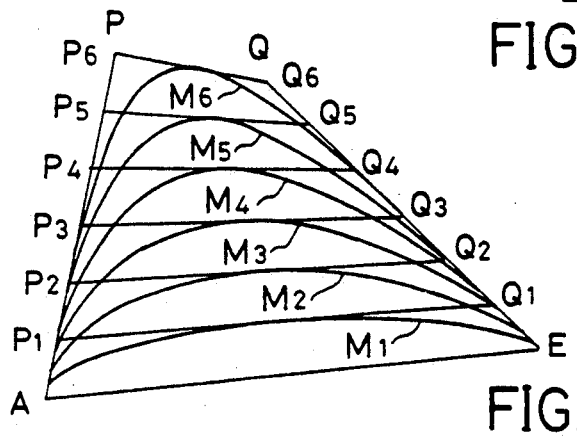
Figure 2C:
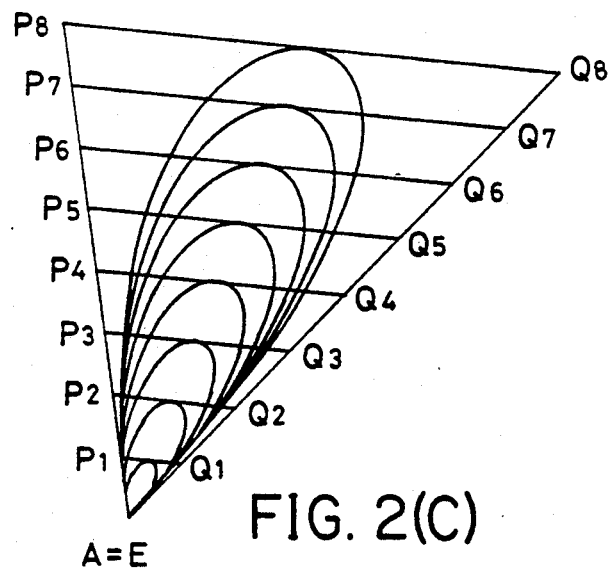

FIGS. 2(A)-(C) show various curves which are defined by the points A, E, P and Q according to Eq.(2), in which FIGS. 2(A) and (B) respectively show six sets of such curves $M_1$-$M_6$. In the curves $M_1$-$M_6$, the coordinate of the points P and Q are changed from $P_1$ to $P_6$ and from $Q_1$ to $Q_6$, respectively. Note that the point P is determined as an intersection of a tangential line AP passing through the initial point A and the line PQ. Similarly, the point Q is determined as an intersection of a tangential line EQ passing through the terminal point E and the line PQ. FIG. 2(C) on the other hand shows eight such curves corresponding to the coordinate of the points P and Q changing from to P and from $Q_1$ to $Q_8$ for a case that the point A agrees with the point E. Note that FIG. 2(A) shows a case in which the line AE is parallel to the line PQ' and FIG. 2(B) shows a case in which the line PQ is not parallel to the line AE. Here, the line PQ symbolically represents a group of lines $P_1$-$Q_1$, $P_2$-$Q_2$, $P_3$-$Q_3$, . . .

As the curves shown in FIGS. 2(A)-(C) have a common feature in that the line PQ makes a tangential contact with the curve itself, the reproducing of the curve according to Eq.(2) becomes significantly easier and the risk that the points P and Q move outside of the field of the image is avoided.

For the case of FIG. 2(A) where the line AE is parallel to the line PQ' the condition $c=d=4$ is satisfied as already described and Eq.(2) can be rewritten as $$\begin{aligned} M(X, Y) &= A(1-t)^3 + (4P - (4-3)A)(1-t)^2 t + \\ &\quad (4Q - (4-3)E)(1-t)t^2 + Et^3 \\ &= A(1-t)^3 + (4P-A)(1-t)^2 t + \\ &\quad (4Q-E)(1-t)t^2 + Et^3 \end{aligned} \quad (3)$$

For the case of FIGS. 2(B) and (C) where the line AE and PQ are not parallel, the coefficient c and d generally fall in a range between three and four. In the most case, the value of the coefficient becomes about 3.9 which is quite close to four. This means that the curve obtained by applying Eq.(3) to the case where the line AE and the line PQ are not parallel satisfactorily approximates the original curve without visually noticeable deformation.

Figure 3:
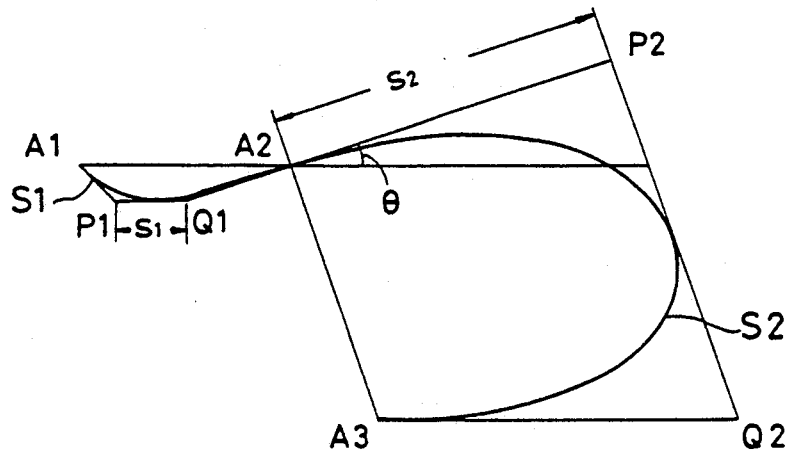
FIG. 3 is a diagram showing the data compression for a case of Japanese letter "tsu" according to an embodiment of the present invention.

Next, a first embodiment of the present invention will be described with reference to FIG. 3 showing an example of data compression for a font of Japanese letter (pronounced "tsu"). The font comprises a first curve portion S1 inscribing in a quadrangle A1A2P1Q1 defined by an initial point A1 and a terminal point A2 as well as other points P1 and Q1 defining a line P1Q1 which, makes a tangential contact with the curve portion S2, and a second curve portion S2 inscribing in a quadrangle A2A3P2Q2 defined by the point A2 acting as the initial point makes a tangential contact with the curve portion S2. Thus, the information which describes the letter can be compressed into two sets of data, one comprising coordinates of the points A1, A2, P1 and Q1 and the other comprising the coordinates of the points A2, A3, P2 and Q2. These points are obtained from the tangentials A1P1, P1Q1, Q1A2 and A2P2, P2Q2, Q2A3 and A3A2. As already noted, the detection of these tangentials can be made easily and automatically from the font formed in the bit map by edge detection.

When the two curves are continuous, the terminal point A2 of the curve portion S1 and the initial point A2 of the curve portion S2 become identical. Thus, a curve comprising n curve portions can generally be represented by n+1 coordinates specifying the initial and terminal points $A_i$ ($i=1, 2, 3, \ldots, n, n+1$) of the curve portions and two coordinates for each of the n curve portions. Thus, the curve can after all be specified by $3n+1$ $(=n+1+2n)$ points.

In the case that the coefficients c and d are set to satisfy the relation $c=d=4$, a line int A2 of the curve portion S1 becomes parallel to the line P1Q1 making a tangential contact with the curve portion S1. Thus, the coordinate of the terminal point Q1 is given by a coordinate pl of the initial point P1 in combination with a distance $s_1$ of the point Q1 measured from the point P1.

For the case of the second curve portion S2, the initial point P2 is located on an extension of a line Q1A2 connecting the point Q1 and the point A2 as is clearly illustrated in FIG. 3, and therefore, the coordinate of the point P2 can be obtained by the coordinate of the point A2 in combination with a distance s2 of the point P2 measured from the point A2.

The position of the point P2 thus represented in terms of the distance $s_2$ is then converted to x- and y-coordinates by using a general relation $x = s \cdot \cos\theta$ and $y = s \cdot \sin\theta$, where $\theta$ stands for an angle defined between the line connecting the points and the abscissa as defined in FIG. 3 and s stands for the distance between the two points. By using the distance data s which is a scaler quantity, one can reduce the information to be processed as compared to a case in which the coordinate of the points is represented by vectors each comprising two components.

Alternatively, one may obtain the coordinate of the points by using a data set comprising a distance data and an argument data of a point with respect to an immediately preceding point. Thus, the coordinate of the point P2 for example is obtained by adding the x- and y-coordinates to the corresponding coordinates of the point Q1 which in turn are obtained by adding the x- and y-coordinates obtained similarly to the x- and y-coordinates of the point P1. When adopting this method, one may quantize the argument data into sixteen directions for example, each separated by 22.5 degrees. In this case, the argument can be digitized by four bit data and the information to be processed is further reduced.

When synthesizing the curve, Eq.(2) is used for each of the curve portions and the coordinate of the dots used for displaying the curve portions S1 and S2 are calculated with a sufficient density. The dots thus obtained are connected by line segments. It is needless to say that the more the number of dots, the more the smoothness of the line is improved. As the curve reproduced by Eq.(2) always makes tangential contact with the line PQ defined by the control points P and Q, the reproduced curve from the points A, E, P and Q closely represents the original font.

When decomposing a font into a number of curve portions having different curvatures and line portions having different lengths, the curve is once divided into a number of unit vectors and the segmentation of the curve into the curve portions and the line portions is performed by detecting the change in the direction of the unit vectors.

In order to avoid unwanted excessive use of memory or transmission band arising when applying Eq.(2) or Eq.(3) involving four parameters to a case where the curve includes a substantial proportion of line portions, it is preferred to separate the line portion from the curved portion by detecting the directional change of the unit vector or the curvature. The line portion thus separated is then represented by the two points corresponding to the initial and terminal points.

Figure 4:
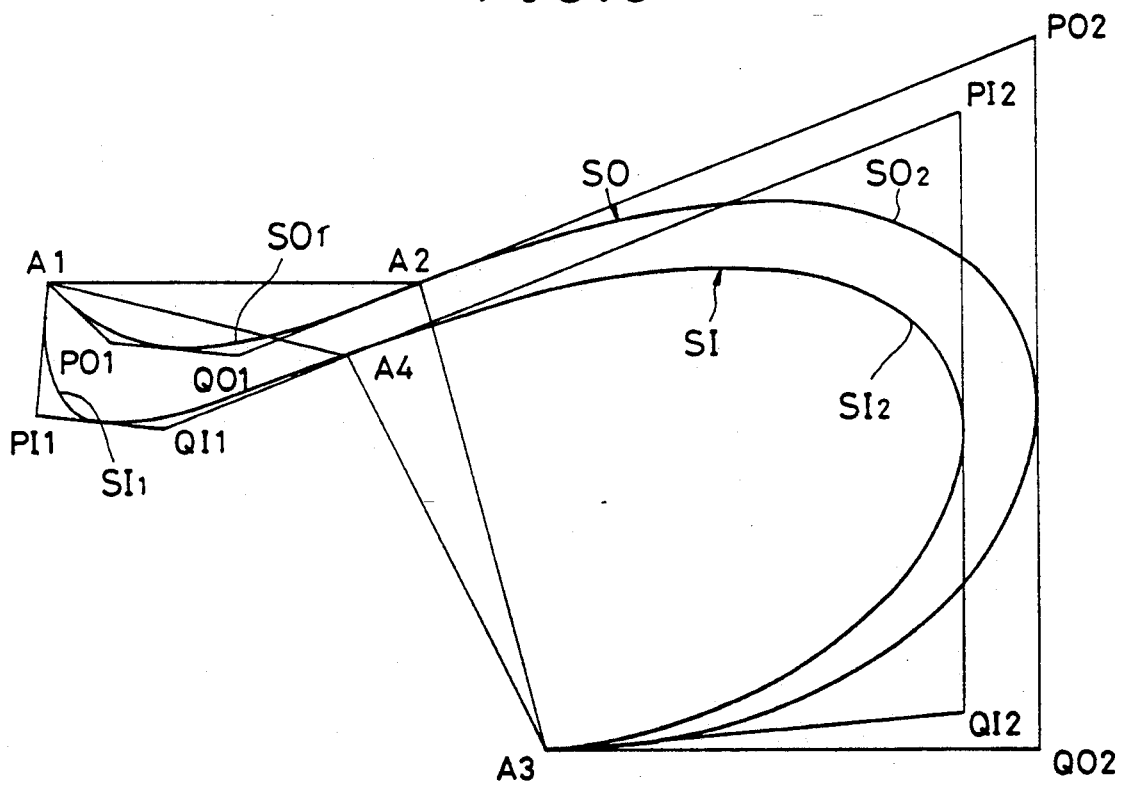
FIG. 4 is an enlarged view showing the compression of data of FIG. 3 in detail.

FIG. 4 shows the data compression of the letter "tsu" for an actual case in which the letter has a finite thickness. After the edge detection of the font "tsu", an edge pattern shown in FIG. 4 is obtained. When the font is represented in a form of bit map, the edge pattern is not smooth but comprises a number of steps. For the sake of simplicity and clarity of the illustration, representation of the edge pattern by stepped line is omitted. The letter comprises a first curve SO defining an outer contour and a second curve SI defining an inner contour of the letter wherein the curve SO comprises a curve portion $SO_1$ corresponding to the curve portion S1 of FIG. 3 and a curve portion $SO_2$ corresponding to the curve portion S2 of FIG. 3 and the curve SI comprises a curve portion $SI_1$ and a curve portion $SI_2$. Similarly to the case of FIG. 3, the curve portion $SO_1$ is represented by the points A1 and A2 as well as points PO1 and QO1 corresponding to the points $P_1$ and $Q_1$, and the curve portion $SO_2$ is represented by the points A2 and A3 as well as points PO2 and QO2 corresponding to the points P2 and Q2. Further, the curve portion $SI_1$ is determined by the initial point A1 as well as points PI1, QI1 and a terminal point A4 which correspond to the parameters A, P, Q and E of Eq.(2) respectively. The curve portion $SI_2$ is determined by the initial point A4 and terminal point A3 as well as points PI2 and QI2 which correspond to the parameters A, P, Q and E of Eq.(2). Note that the points A1, PI1, QI1 and A4 defines a quadrangle PI1QI1A4 in which the curve portion $SI_1$ inscribes, and the points A4, PI2, QI2 and A3 defines a quadrangle A4PI2QI2A3 in which the curve portion $SI_2$ inscribes. As the data compression for the curve portions $SO_1$, $SO_2$, $SI_1$ and $SI_2$ are identical to that of the curve portions S1 and S2 already described with reference to FIG. 3, further description will be omitted. When these curves are reproduced according to Eq.(2) or (3), area surrounded by the curves SO and SI is filled by dots as usual.

Figure 5:
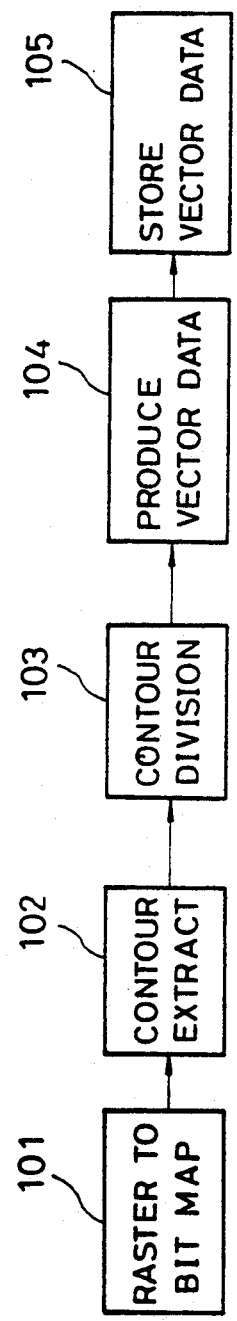
FIG. 5 is a block diagram showing a procedure for a raster-vector conversion.

FIG. 5 shows a raster-vector conversion procedure for compressing an image data according to Eq.(2) or (3). Referring to the drawing, the image to be compressed is read by raster scanning and the like in a step 101, whereby the read image is stored in a pattern memory in a form of a bit map. Next, a contour of the pattern is extracted from the bit map in a step 102 by edge filtering and the like, and the contour thus obtained is divided into a number of line portions and curve portions on the basis of curvature detection in a step 103. In a step 104, the line portions extracted in the step 103 is compressed into a vector data comprising coordinates of the initial point and terminal point and the curve portions is compressed into a vector data comprising coordinates of the four parameters A, E, P and Q of Eq.(2) or Eq.(3). The vector data thus obtained is then stored in a memory as shown in a step 105.

Figure 6:
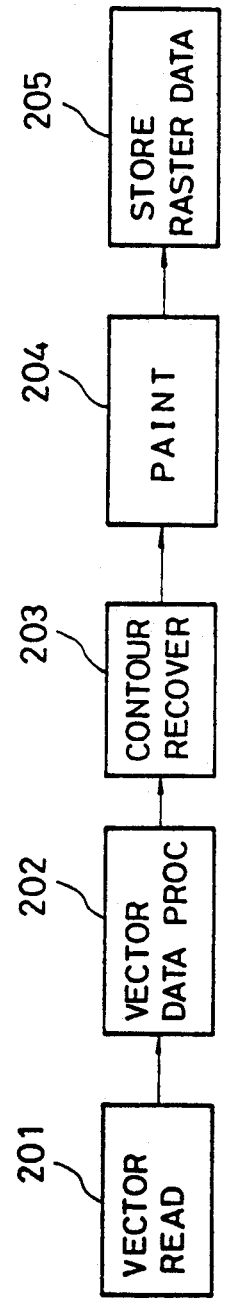
FIG. 6 is a block diagram showing a procedure for a vector-raster conversion.

When the image data compression method of the present invention is applied to a facsimile transmission system, the vector data is transmitted to a reception side where the original image is recovered according to a vector-raster conversion procedure shown in FIG. 6. Referring to FIG. 6, the vector data is read out in a step 201 from a memory storing the received vector data and the contour of the curve portion is reproduced in a step 202 according to Eq.(2) or Eq.(3). The contour of the line portion is reproduced from the coordinate of its initial point and terminal point as already described. In a step 203, the overall contour of the original image is recovered by connecting the contours thus reproduced Further, an area surrounded by the contour of the image thus recovered is filled by dots in a step 204 and a bit map of the dots thus obtained is stored in a pattern memory in a step 205. The bit map thus obtained is converted to a visual image by a printer and the facsimile transmission of the image is completed.

It should be noted that the vector data may be represented by a radial distance and an argument measured from a reference point instead of representing by the ordinary x- and y- coordinate as already described.

Further, when the image is satisfactorily approximated on the assumption that the coefficient d and the coefficient d are both four and the line AE and the line PQ are parallel, the vector data for one of the points on the line AE and one of the points on the line PQ may be simply represented by a distance from the other point on the line. In this case, the vector data is represented by scaler and the memory space for storing the vector data is saved.

It would be obvious that the present invention provides a facsimile transmission system wherein the compression of image data is achieved by using the raster-vector conversion system shown in FIG. 5 in the transmission side and by using the vector-raster conversion system shown in FIG. 6 in the reception side.

Figure 7:
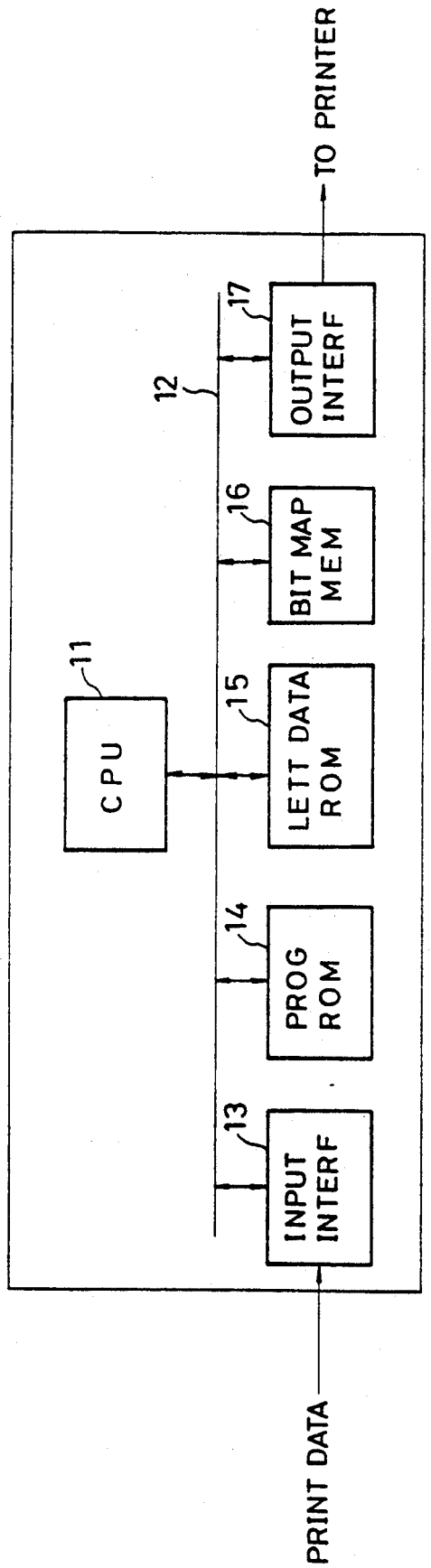
FIG. 7 is a block diagram showing a printer controller to which the present invention is applied.

FIG. 7 shows a printer controller for controlling an image printer in which the image data compression method of the present invention is applied. Referring to FIG. 7, the printer controller comprises a central processing unit (CPU) 11 connected to an input interface 13, a read only memory (ROM) 14, another ROM 15, a bit map memory 16 and an output interface 17 via a bus 12. The output interface 17 is connected to the printer (not shown). In operation, a print data specifying the letter to be printed as well as associated informations is supplied to the input interface 13. The ROM 14 stores a program for executing operation of Eq.(2) and the ROM 15 stores a letter data such as the coordinate of the initial and terminal points of curve portions forming the letter image, the initial and terminal points of the lines making the initial and terminal points of the line portions, and the like.

When a print data specifying a letter code and letter size is supplied to the input interface 13 from a processor and the like, the CPU 11 reads out the letter data from the ROM 15 on the bus 12 and calculates the coordinates which specify the curves and lines on the basis of the specified magnification factor. The coordinates thus obtained are transferred to the bit map memory 16. The CPU 11 then produces curves and lines according to the program stored in the ROM 14 using these coordinates, and writes the coordinate of the contour of the letter thus calculated into the bit map memory 16. Further, the CPU 11 performs area filling of the region thus surrounded by the contours according to the needs. Thus, there is formed the bit map of the letter in the memory 16. The bit map thus formed in the memory 16 is then sent to the printer or a plotter through the output interface 17 and the letter is printed on a sheet of paper.

The description for positional setting of the letter at the time of print out will be omitted as such a procedure is not pertinent to the subject matter of the present invention. Such a procedure is well known to those skilled in the art.

Further, the present invention is not limited to these embodiments described heretofore but various variations and modifications may be made without departing from the scope of the invention.

What is claimed is:

1. A method of transmitting and receiving image data in a compressed format, the method comprising:
   a) storing a scanned image as a raster pattern in a pattern storage device;
   b) extracting a contour of the pattern from the pattern storage device;
   c) dividing the contour into line portions and curve portions;
   d) compressing the line portions into an initial point and a terminal point, and compressing the curve portions into first, second, third and fourth vector data, using a procedure including the steps of:
      1) defining the initial point as the first vector datum;
      2) defining the terminal point as the second vector datum;
      3) detecting a first tangent passing through the initial point of the curve portion and making a tangential contact therewith;
      4) detecting a second tangent passing through the terminal point of the curve portion and making a tangential contact therewith;
      5) detecting a third tangent passing through a point on the curve portion other than the initial and terminal points;
      6) defining the third vector datum as the intersection of the first tangent and third tangent; and
      7) defining fourth vector datum as the intersection of the second tangent and third tangent;
   e) storing the first, second, third, and fourth vector data in a vector data storage device;
   f) transmitting the vector data stored in the vector data storage device;
   g) receiving the vector data;
   h) storing the vector data in a vector data storage device;
   i) forming, from the vector data in the vector data storage device, a curve portion contour based on the vector data and first, second and third tangents defined by the vector data; and reproducing a line portion contour based on initial and terminal points; the forming steps performed in accordance with a polynomial M(X,Y) defined by $$A(1-t)^3 + (cP-(c-3)A)(1+t)^2 t + (dQ+(d-3)E)(1-t)^2 + Et^3$$

wherein
   A stands for the first vector datum,
   E stands for the second vector datum,
   P stands for the third vector datum,
   Q stands for the fourth vector datum,
   c and d are predetermined coefficients, and
   t is a parameter changing its value between zero and one and representing a position on the curve;
   j) forming a bit map based on the contours; and
   k) storing the bit map as a pattern in a pattern storage device.

2. The method of claim 1 further comprising the step of:
   scanning an image which is to be compressed to form the scanned image.

3. The method of claim 1, wherein the step of transmitting the vector data includes:
   transmitting the vector data using a facsimile transmission system.

4. The method of claim 1, further comprising the step of:
   filling in an area defined by the contours before forming the bit map.

5. The method of claim 1, further comprising the step of:
   converting the bit map in the pattern storage device into a visual image.

6. The method of claim 1, wherein:

the third tangent is parallel to a lien connecting the initial point and the terminal point.

7. The method of claim 6, wherein:
the coefficients c and d are both set to four.

8. A system for forming an image from compressed image data, the system comprising:
 a) an input interface for receiving one or more input characters;
 b) a character data storage device having the compressed image data relating to curve portions, line portions and tangents, each for various predefined characters which may constitute the input characters;
 c) a program storage device including instructions for producing curve portions and line portions from first, second, third and fourth vector data and initial and terminal points, in accordance with a method including the steps of:
  1) defining the initial point as the first vector datum;
  2) defining the terminal point as the second vector datum;
  3) defining the first tangent as passing through the initial point of the curve portion contour and making a tangential contact therewith;
  4) defining the second tangent as passing through the terminal point of the curve portion contour and making a tangential contact therewith;
  5) defining the third tangent passing through a point on the curve portion contour other than the initial and terminal points;
  6) defining the third vector datum as the intersection of the first tangent and third tangent; and
  7) defining fourth vector datum as the intersection of the second tangent and third tangent;
 d) a processor for reading the compressed image data from the character data storage device, calculating coordinates relating to the curve portions and line portions, and generating contours based on the coordinates;
 e) a bit map storage device for storing the contours; and
 f) an output interface for transferring the contours from the bit map storage device to an external display device;
wherein said program storage device includes instructions for forming the contours by forming the curve portion contour in accordance with a polynomial M(X,Y) defined by $$A(1-t)^3+(cP-(c-3)A)(1-t)^2t+(dQ-(d-3)E)(1-t)^2+Et^3$$

wherein
A stands for the first vector datum,
E stands for the second vector datum,
P stands for the third vector datum,
Q stands for the fourth vector datum,
c and d are predetermined coefficients, and
t is a parameter changing its value between zero and one and representing a position the curve.

9. The system of claim 8, wherein:
the processor calculates the coordinates specifying the curve portion and line portion based on a predetermined magnification factor, before storing the curve portions and line portions in the bit map storage device.

10. The system of claim 8, wherein:
the coefficients c and d are both set to four.

* * * * *